Figure 1:
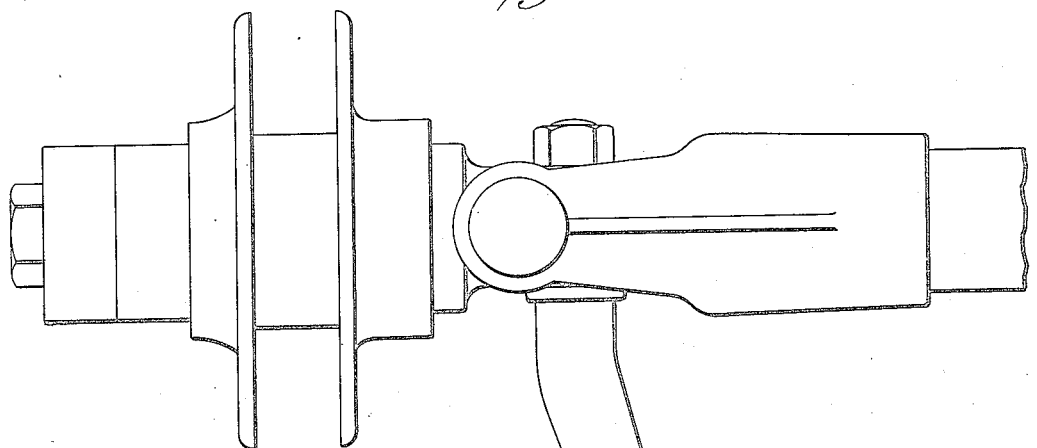
Figure 1:
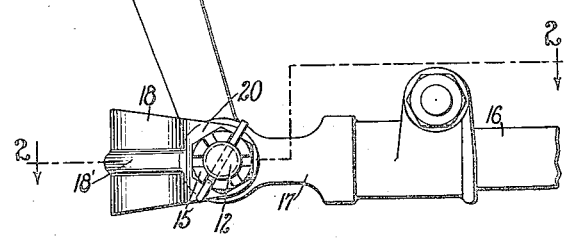

G. W. EDMONSTON.
ANTIRATTLER.
APPLICATION FILED OCT. 5, 1917.

1,281,769.

Patented Oct. 15, 1918.

WITNESSES

INVENTOR
G. W. Edmonston
BY
ATTORNEYS

UNITED STATES PATENT OFFICE.

GEORGE WESLEY EDMONSTON, OF PLATTENVILLE, LOUISIANA.

ANTIRATTLER.

1,281,769.  Specification of Letters Patent.  Patented Oct. 15, 1918.

Application filed October 5, 1917. Serial No. 194,878.

*To all whom it may concern:*

Be it known that I, GEORGE W. EDMONSTON, a citizen of the United States, and a resident of Plattenville, in the parish of Assumption and State of Louisiana, have invented a new and Improved Antirattler, of which the following is a full, clear, and exact description.

This invention relates to anti-rattling devices for couplings and has particular reference to means for preventing rattling and excessive wear in the knuckle connecting the automobile steering arm with the transverse connecting rod associated with the steering gear.

More specifically stated the object of this invention is to provide a U-shaped or looped spring acting between the pivot bolt and the steering arm knuckle in such a manner as to prevent rattling or unnecessary wear in connection with said bolt.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 2:
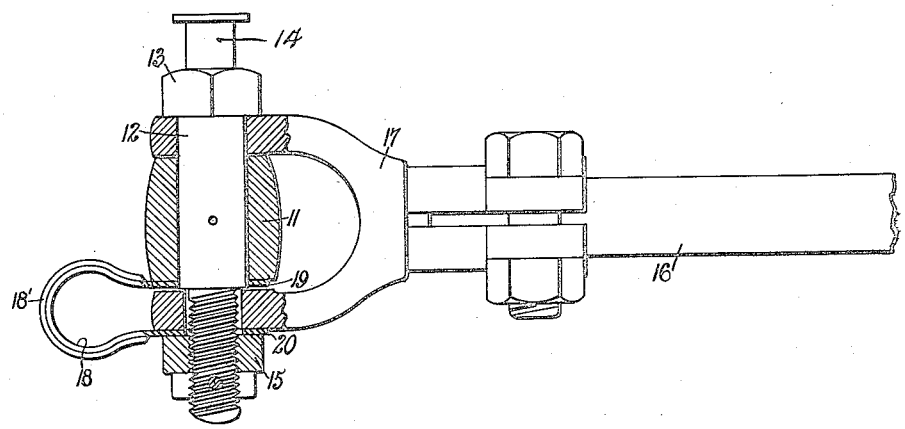

Figure 1 is a bottom plan view of my improvement shown applied to an automobile steering device; and Fig. 2 is a vertical transverse section on the line 2—2 of Fig. 1, on a scale somewhat larger than that of Fig. 1.

Referring now more particularly to the drawings I show at 10 a conventional form of steering arm having a knuckle 11 constituting a vertical bearing for the hollow pivot bolt 12 having a head 13, an oil cup 14 and a lock nut 15.

16 indicates the connecting rod to which is connected a knuckle fork 17 embracing the knuckle 11 and having coaxial holes through which the bolt projects on the upper and lower sides of the knuckle 11.

The principal feature of my invention is the spring 18 shown as substantially U-shaped and having two parallel legs 19 and 20 connected by a rounded loop which may be formed with a central rib 18', if desired, for the purpose of stiffening the same. The legs 19 and 20 of the spring are formed with coaxial holes through which the bolt 12 projects, and these legs lie on the upper and lower sides of the lower portion of the fork 17. In other words the leg 19 lies between the knuckle 11 and the bottom of the fork while the lower leg 20 lies between the fork and the lock nut 15. The force of the spring tends to separate the two legs 19 and 20, hence when the nut 15 is tightened upon the bolt 12 the leg 20 is forced toward or against the fork 17 and the head 13 of the bolt is drawn snugly against the opposite side of the fork 17. It follows therefore that the tendency of the leg 19 of the spring is to move in an opposite direction from the leg 20; the knuckle 11 against which said leg 19 bears will be held snugly against the upper branch of the fork or adjacent to the head of the bolt. It also follows that owing to the length of the knuckle and the thickness of the leg 19 of the spring being approximately equal to the distance between the members of the fork 17, the knuckle has but slight play on the bolt. It will thus be seen that while the tension thus applied to the coupling devices will not interfere materially with the pivotal action at or on the bolt there can be no rattling with respect to the parts longitudinally of the bolt in practice.

I claim:

In an anti-rattler for automobile steering gear, the combination of the steering arm having a knuckle, the steering fork between the members of which the knuckle is arranged, the fork and knuckle having registering openings, a cylindrical bolt passing through the openings of the fork and knuckle, a nut on the bolt, and a U-shaped spring straddling one member of the fork and having registering openings through which the bolt passes, the length of the knuckle and the thickness of the member of the spring between the knuckle and the fork member being approximately equal to the distance between the said fork members, whereby the knuckle will have but slight play between the fork members and will be held against one of the said members.

GEORGE WESLEY EDMONSTON.